June 12, 1928.

J. DE LA CIERVA

AIRCRAFT WITH ROTATIVE WINGS

Filed Nov. 1, 1926

1,673,232

Inventor.
J. de la Cierva
by Fisherston Haugh & Co
Attys.

Patented June 12, 1928.

1,673,232

UNITED STATES PATENT OFFICE.

JUAN DE LA CIERVA, OF MADRID, SPAIN.

AIRCRAFT WITH ROTATIVE WINGS.

Application filed November 1, 1926, Serial No. 145,653, and in Great Britain November 19, 1925.

This invention relates to aircraft of the type embodying a freely rotative hinged-wing system such as that described in my patent specification No. 1,590,497, and is more particularly directed to improvements whereby the aerodynamical and mechanical efficiency of the system may be increased by maintaining a more constant angular velocity of the rotating wing system in flight.

It is found in practice that there is an optimum value for this angular velocity, which value may vary according to the characteristics of the wings.

Where such revolving wing systems depend for their rotation solely upon the action of the air in flight it has been found that the rotational speed of the system varies with the angles of incidence of the wings, and that the angular velocity reaches its maximum in the mean range of incidence and decreases both at greater and lesser incidences.

According to the present invention a torque, independent of that produced by the action of the air on the wings, is applied to the rotating wing system when its angular velocity tends to fall below the region of the optimum value.

The source of power is preferably the prime mover of the aircraft and the transmission mechanism may be of any convenient description, and advantageously includes a clutch, reducing gear and a free wheel device.

The ratio of the reducing gear is such that over the normal range of prime mover speeds and so long as the wing system is rotating in the region of its optimum velocity no torque is transmitted thereto from the prime mover, the free wheel device permitting the wing system to over-run free from the prime mover.

When however the wing system tends to fall below its predetermined minimum velocity the free wheel device engages and transmits a small torque to the system sufficient to maintain or increase its velocity. Since the inertia of the wing system is considerable, the clutch is preferably such as to permit a certain amount of slip between its elements so that the take-up of torque may be gradual.

The transmission may further include arrangements, various forms of which are well-known, for disengaging entirely in the event of a sudden or violent acceleration of the prime mover, or the transmission may remain normally disengaged to be put manually into operation when desired.

Another form of transmission which may be employed for the purposes of this invention and which is well-known in the propulsion of motor road vehicles comprises one or more dynamo-electric machines with their elements connected respectively to the prime mover and the rotative wing system.

Such an arrangement inherently provides for the free over-run of the rotating wing system and for the gradual application of torque. In all cases the torque may be applied in any convenient manner to the wing system, for example the shaft to which the wings are hinge-jointed may be prolonged downwardly and geared to a shaft connected through the various transmission elements to the prime mover shaft.

Since the power applied to the wing system according to this invention is very small, the couple tending to rotate the body of the aircraft about the axis of rotation of the wing system can be neutralized in various ways, for example by longitudinal fins or vanes acting after the manner of direction governors. The resulting lateral drift, if any, is so slight as to be unimportant.

Constructional embodiments of the present invention are illustrated more or less diagrammatically in the accompanying drawings, in which:—

In these drawings:—

A indicates the fuselage of an aircraft equipped with freely rotative wings B hinge-jointed to a shaft C in the manner described in my patent specification No. 1,590,497. D indicates a prime mover such as an internal combustion engine driving the air screw E.

Figure 1:
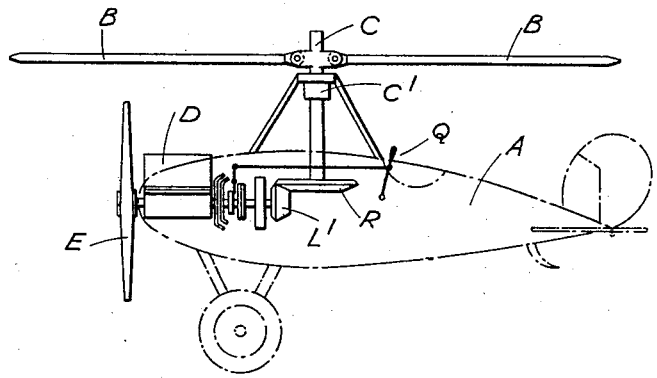
Fig. 1 is a side elevational view of one form of mechanical transmission, the aircraft in which it is located being indicated in broken lines.
Figure 2:
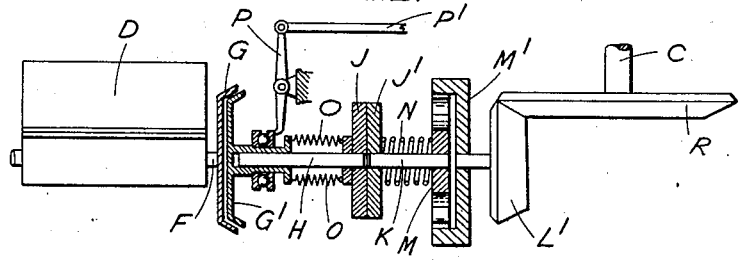
Fig. 2 is a longitudinal section drawn to an enlarged scale of the transmission illustrated in Fig. 1.

Referring now to Figures 1 and 2.

A rearward prolongation of the prime mover shaft F carries one element G of a cone clutch the other element G¹ of which is keyed to a shaft H which carries at its rear end a plate J in frictional engagement with a similar plate J¹ fast on a short shaft K which drives a bevel pinion L¹ in one direction only through a free wheel device M M¹ of any known or convenient type. The compression spring N bearing on the element M of the free wheel device serves to maintain the plates J and J¹ in frictional engagement, whilst tension springs O keep the clutch G G¹ normally disengaged, a lever P being connected through rod P¹ to a hand operated lever Q for the purpose of engaging the clutch G G¹ when required. Alternatively, the clutch G G¹ may be normally held engaged, with the hand operating means arranged to disengage the clutch elements. Furthermore where the clutch G G¹ can be made to allow the necessary slip, and yet to engage sufficiently tightly to ensure the eventual transmission of power, the friction plates J J¹ may be dispensed with.

The shaft C is prolonged downwards through a bearing C¹ and carries a bevel wheel R engaging the pinion L¹. As herein illustrated the desired speed reduction between the prime mover and the wing system is effected through the two wheels L¹ R, but it is obvious that a train of gearing or any other form of speed reducing gear may be employed according to circumstances. Furthermore the entire transmission may be modified in any desired manner, the form illustrated being by way of example only of an arrangement of elements which it is desirable to include in a mechanical transmission for the purposes of this invention.

Figure 3:
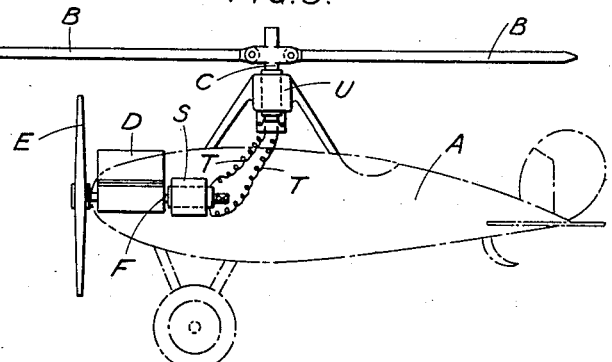
Fig. 3 is a side elevational view of an electrical transmission.
Figure 4:
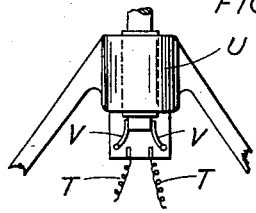
Fig. 4 is a local view to an enlarged scale showing one form of automatic circuit breaker depending for its operation on the rotational speed of the wing system.

In Figures 3 and 4 the prime mover shaft F is provided with a differential generator S supplying current through leads T to a motor U, the armature of which is carried by the shaft C of the rotating wing system. In order that the motor U shall be energized to drive the wing system only when the rotational speed of the latter tends to fall below its optimum value, a centrifugal governor V (see Fig. 4) is provided with contacts and connections adapted to close the circuit from the leads T through the motor U when the rotational speed of the wing system decreases as aforesaid.

I wish it to be understood that the provision of means for applying a torque to the rotative wing system to maintain its optimum angular velocity in flight does not constitute an aircraft so equipped a helicopter since the wing system normally rotating freely by reason of wind action alone adequately supports the aircraft and it is only in order to improve the general efficiency of the system under certain conditions such, for example, as excessive angles of incidence, that a torque is applied to the wings to assist temporarily in maintaining their optimum angular velocity.

What I claim is:—

1. An aircraft embodying rotative wings hingedly connected to the axle of rotation and normally driven by the air flow across them in flight, and a transmission system between the prime mover of the aircraft and the wing system adapted to apply a torque to said wing system when its angular velocity tends to fall below the region of its optimum or other predetermined value.

2. An aircraft embodying rotative wings hingedly connected to the axis of rotation and normally driven by the air flow across them in flight, a transmission system between the prime mover of the aircraft and the wing system adapted to apply a torque to said wing system when its angular velocity tends to fall below a predetermined value and manually actuated means whereby the power transmission system may be made operative or inoperative at will.

3. In an aircraft having a freely rotative hinged-wing system of the type referred to, a power transmission system between the prime mover of the aircraft and the rotative wings embodying a free wheel device and a suitable clutch such that a torque is transmitted from the prime mover to the wing system when the speed of the latter tends to fall below a predetermined value relatively to the prime mover speed, whilst permitting the wing system to rotate freely so long as its speed exceeds the said value.

4. In an aircraft having a freely rotative hinged-wing system of the type referred to, a power transmission system between the prime mover of the aircraft and the rotative wings embodying a free wheel device, a reduction gear and a suitable clutch such that a torque is transmitted from the prime mover to the wing system when the speed of the latter tends to fall below a predetermined value relatively to the prime mover speed, whilst permitting the wing system to rotate freely so long as its speed exceeds the said value.

JUAN DE LA CIERVA.